US011190343B2

(12) United States Patent
Shim (10) Patent No.: US 11,190,343 B2
(45) Date of Patent: Nov. 30, 2021

(54) MULTIVARIATE QUADRATIC SIGNATURE SCHEME BASED ON CENTRAL MAP WITH OIL-OIL QUADRATIC TERMS SECURE AGAINST QUANTUM COMPUTERS

(71) Applicant: INSTITUTE FOR BASIC SCIENCE, Daejeon (KR)

(72) Inventor: Kyung Ah Shim, Daejeon (KR)

(73) Assignee: INSTITUTE FOR BASIC SCIENCE, Daejeon (KR)

(*) Notice: Subject to any disclaimer, the term of this patent is extended or adjusted under 35 U.S.C. 154(b) by 209 days.

(21) Appl. No.: 16/200,016

(22) Filed: Nov. 26, 2018

(65) Prior Publication Data

US 2020/0145201 A1    May 7, 2020

(30) Foreign Application Priority Data

Nov. 5, 2018   (KR) ...................... 10-2018- 0134507

(51) Int. Cl.
*H04L 9/08*   (2006.01)
*H04L 9/30*   (2006.01)
*H04L 9/06*   (2006.01)
*G06F 17/12*  (2006.01)
*G06F 17/16*  (2006.01)

(52) U.S. Cl.
CPC ............ *H04L 9/0825* (2013.01); *G06F 17/12* (2013.01); *G06F 17/16* (2013.01); *H04L 9/0643* (2013.01); *H04L 9/3026* (2013.01)

(58) Field of Classification Search
CPC ... H04L 9/0825; H04L 9/0643; H04L 9/3026; G06F 17/12; G06F 17/16

USPC .......................................................... 380/44
See application file for complete search history.

(56) References Cited

U.S. PATENT DOCUMENTS

| 7,158,636 B2 | 1/2007 | Ding |
| 8,811,608 B2 | 8/2014 | Sella et al. |
| 2011/0091039 A1* | 4/2011 | Spitz ..................... H04L 9/321 380/260 |

FOREIGN PATENT DOCUMENTS

| KR | 10-1768641 | 8/2017 |
| KR | 101768641 B1 * | 8/2017 |

OTHER PUBLICATIONS

"HS-Sign: A Security Enhanced UOV Signature Scheme Based on Hyper-Sphere" KSII Transactions on Internet and Information Systems vol. 11, No. 6, Jun. 2017, pp. 3166-3187.

* cited by examiner

*Primary Examiner* — Kambiz Zand
*Assistant Examiner* — Phuc Pham (57) ABSTRACT

An electronic device including a key generator is disclosed. The key generator acquires a first affine map, a second affine map, and a third map, and generates a public key using the first affine map, the second affine map, and the third map, the third map is a system of multivariate quadratic polynomials having n variables and m equations, at least one of the multivariate quadratic polynomials has oil-oil quadratic terms with non-zero coefficients, and the third map includes at least one set for defining vinegar variables used in an Oil and Vinegar method and index sets for defining oil variables used in the Oil and Vinegar method, and each of the first affine map, the second affine map, and the third map is a finite field.

14 Claims, 5 Drawing Sheets

MULTIVARIATE QUADRATIC SIGNATURE SCHEME BASED ON CENTRAL MAP WITH OIL-OIL QUADRATIC TERMS SECURE AGAINST QUANTUM COMPUTERS

CROSS-REFERENCE TO RELATED APPLICATION

This application claims priority under 35 U.S.C. § 119 from Korean Patent Application No. 10-2018-0134507 filed on Nov. 5, 2018, the disclosures of which are hereby incorporated by reference in their entireties.

TECHNICAL FIELD

Embodiments of the present inventive concept relate to an electronic signature, and more particularly to a method capable of performing multivariate quadratic digital signature scheme based on a central map with oil-oil quadratic terms, which is secure against quantum computers, and an electronic device capable of performing the method.

DISCUSSION OF RELATED ART

A multivariate quadratic signature means an electronic signature (or referred to as a "digital signature") used in a multivariate cryptography system. Here, the multivariate cryptography system refers to an asymmetric cryptography system based on multivariate polynomials defined on a finite field. In particular, when a degree of multivariate polynomials used in a multivariate cryptography system is two, the multivariate cryptography system is referred to as a multivariate quadratic cryptography system.

SUMMARY

An object of the present inventive concepts is to provide a method of using a multivariate quadratic electronic signature scheme which destroys a structure without oil-oil quadratic terms by adding oil-oil quadratic terms with non-zero coefficients to at least one of multivariate quadratic polynomials, and can generate an electronic signature of a message by inverting a multivariate quadratic central map despite the existence of at least one polynomial having oil-oil quadratic terms with non-zero coefficients among multivariate quadratic polynomials, and an electronic device capable of executing the method.

An exemplary embodiment of the present inventive concepts is directed to an electronic device, including a key generator, in which the key generator acquires a first affine maps $S: \mathbb{F}_q^m \to \mathbb{F}_q^m$, a second affine map $T: \mathbb{F}_q^n \to \mathbb{F}_q^n$, and a third map $\mathcal{F}: \mathbb{F}_q^n \to \mathbb{F}_q^m = (\mathcal{F}^{(1)}, \ldots, \mathcal{F}^{(m)})$, and generates a public key $\mathcal{P} = S \circ \mathcal{F} \circ T$ using the first affine map, the second affine map, and the third map, the third map $\mathcal{F}$ is a system of multivariate quadratic polynomials $\mathcal{F}^{(1)}, \ldots, \mathcal{F}^{(m)}$ having n variables and m equations, at least one of the multivariate quadratic polynomials has oil-oil quadratic terms with non-zero coefficients, the third map $\mathcal{F}$ includes at least one first index set for defining vinegar variables used in the Oil and Vinegar method and at least one second index set for defining oil variables used in the oil and vinegar method, and $\mathbb{F}_q$ is a finite field in which the number of elements is q.

Another exemplary embodiment of the present inventive concepts is directed to an electronic signature method using an electronic device, including acquiring a first affine maps $S: \mathbb{F}_q^m \to \mathbb{F}_q^m$, a second affine map $T: \mathbb{F}_q^n \to \mathbb{F}_q^n$, and a third map $\mathcal{F}: \mathbb{F}_q^n \to \mathbb{F}_q^m = (\mathcal{F}^{(1)}, \ldots, \mathcal{F}^{(m)})$; and generating a public key $\mathcal{P} = S \circ \mathcal{F} \circ T$ using the first affine map, the second affine map, and the third map, in which the third map $\mathcal{F}$ is a system of multivariate quadratic polynomials $\mathcal{F}^{(1)}, \ldots, \mathcal{F}^{(m)}$ having n variables and m equations, at least one of the multivariate quadratic polynomials has oil-oil quadratic terms with non-zero coefficients, the third map $\mathcal{F}$ includes at least one first index set for defining vinegar variables used in the Oil and Vinegar method and at least one second index set for defining oil variables used in the Oil and Vinegar method, and $\mathbb{F}_q$ is a finite field in which the number of elements is q.

Still another exemplary embodiment of the present inventive concepts is directed to an electronic signature method using an electronic device, including acquiring a first affine maps $S: \mathbb{F}_q^m \to \mathbb{F}_q^m$, a second affine map $T: \mathbb{F}_q^n \to \mathbb{F}_q^n$, and a third map $\mathcal{F}: \mathbb{F}_q^n \to \mathbb{F}_q^m = (\mathcal{F}^{(1)}, \ldots, \mathcal{F}^{(m)})$, generating a public key $\mathcal{P} = S \circ \mathcal{F} \circ T$ using the first affine map, the second affine map, and the third map, and receiving an authentication for the public key $\mathcal{P}$ from the outside of the electronic device after the public key $\mathcal{P}$ is transmitted to the outside of the electronic device, in which the third map $\mathcal{F}$ is a system of multivariate quadratic polynomials $\mathcal{F}^{(1)}, \ldots, \mathcal{F}^{(m)}$ having n variables and m equations, at least one of the multivariate quadratic polynomials has oil-oil quadratic terms with non-zero coefficients, the third map $\mathcal{F}$ includes at least one first index set for defining vinegar variables used in the Oil and Vinegar method and at least one second index set for defining oil variables used in the Oil and Vinegar method, and $\mathbb{F}_q$ is a finite field in which the number of elements is q.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF EXEMPLARY EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A multivariate quadratic electronic signature scheme based on a central map (or referred to as a "secret central map") with oil-oil quadratic terms, which is secure against quantum computers, is disclosed in the present specification.

A main idea of the configuration of a multivariate quadratic (MQ) electronic signature scheme is to find an invertible map ($\mathcal{F}: \mathbb{F}_q^n \to \mathbb{F}_q^m$) of m multivariate quadratic polynomials having n variables. Then, two invertible affine maps or two invertible linear maps (S: $\mathbb{F}_q^m \to \mathbb{F}_q^m$ and T: $\mathbb{F}_q^n \to \mathbb{F}_q^n$) are selected to hide a special structure of a central map $\mathcal{F}$ with a public key $\mathcal{P}$. Each of i, j, n, m, k, q, and v in the present specification is a natural number of 1 or more.

Since the public key $\mathcal{P}$ is composed of a quadratic map $\mathcal{P} = S \circ \mathcal{F} \circ T$, and the public key $\mathcal{P}$, that is, the quadratic map $\mathcal{P} = S \circ \mathcal{F} \circ T$, is almost indistinguishable from a random system, it is difficult to invert. Here, a circle means a composition. A secret key is composed of $S.\mathcal{F}.T$ which can invert the public key $\mathcal{P}$.

The public key $\mathcal{P}$ is defined by Equation 1, and is a system $\mathcal{P} = (\mathcal{P}^{(1)}, \ldots, \mathcal{P}^{(m)})$ of multivariate polynomials having m equations and n variables.

$$\mathcal{P}^{(k)}(x_1, \ldots, x_n) = \sum_{i=1}^{n} \sum_{j=1}^{n} p_{ij}^{(k)} x_i x_j + \sum_{i=1}^{n} p_i^{(k)} x_i + p_0^{(k)} \quad \text{[Equation 1]}$$

Here, k=1, . . . , m, $p_{ij}^{(k)}$ and $p_i^{(k)}$ represent coefficients of corresponding terms, $p_0^{(k)}$ represents a constant, and each value is randomly chosen within a finite field $\mathbb{F}_q$ in which the number of elements is q.

The main ideas of the present inventive concepts are:

(i) to destroy the structures of conventional multivariate quadratic polynomials without oil-oil quadratic terms of non-zero coefficients by adding at least one of multivariate polynomial with oil-oil quadratic terms of non-zero coefficients to the multivariate quadratic polynomials in the central map, (ii) to provide a new inverting method of a central map despite the existence of at least one polynomial with oil-oil quadratic terms of non-zero coefficients among the multivariate quadratic polynomials in the central map.

New Central Map According to the Present Inventive Concepts (New Central Map)

In order to configure a new central map with oil-oil quadratic terms having non-zero coefficients according to the present inventive concepts, when the number of layers is one (1) in the present inventive concepts, two index sets V and O are required. For example, the number of index sets for defining oil variables used in an Oil and Vinegar method is determined according to the number of layers or is dependent on the number of layers.

$$V=\{1, \ldots, v\}, O=\{v+1, \ldots, v+o\}$$

Here, |V|=v, and |O|=o. V is an index set for defining vinegar variables used in an Oil and Vinegar method, and O is an index set for defining oil variables used in the Oil and Vinegar method.

The central map $\mathcal{F} = (\mathcal{F}^{(1)}, \ldots, \mathcal{F}^{(m)})$, that is, a system of multivariate quadratic polynomials having m (m=o) equations and n (n=v+m) variables, is defined as in Equations 2 and 3.

$\mathcal{F}^{(k)}$ for k=1, . . . , m−1 is defined as in Equation 2.

$$\mathcal{F}^{(k)}(x) = \sum_{i \in O, j \in V} \alpha_{ij}^{(k)} x_i x_j + \sum_{i,j \in V, i \leq j} \beta_{ij}^{(k)} x_i x_j + \sum_{i \in V \cup O} \gamma_i^{(k)} x_i + \eta^{(k)} \quad \text{[Equation 2]}$$

$\mathcal{F}^{(k)}$ for k=m is defined as in Equation 3.

$$\mathcal{F}^{(k)}(x) = \sum_{i \in O, j \in V} \alpha_{ij}^{(k)} x_i x_j + \sum_{i,j \in V, i \leq j} \beta_{ij}^{(k)} x_i x_j + \sum_{i,j \in O, i \leq j} \delta_{i,j}^{(k)} x_i x_j + \sum_{i \in V \cup O} \gamma_i^{(k)} x_i + \eta^{(k)} \quad \text{[Equation 3]}$$

Here, x is a vector $x=(x_1, \ldots, x_n)$, $\alpha_{ij}^{(k)}$, $\beta_{ij}^{(k)}$, $\delta_{ij}^{(k)}$, and $\gamma_i^{(k)}$ represent coefficients of corresponding terms, $\eta^{(k)}$ represents a constant, and each value is randomly chosen in the finite field $\mathbb{F}_q$ in which the number of elements is q.

When the number of layers is 1, a parameter set of the scheme according to the present inventive concepts is $\mathbb{F}_q$.v.o.

How to Invert a New Central Map

When $\xi=(\xi_1, \ldots, \xi_m)$ is given, processes of finding $\mathcal{F}^{-1}(\xi)=s$, that is, solutions s of $\mathcal{F}(x)=\xi$, are as follows.

A random vector of vinegar values, $s_v=(s_1, \ldots, s_v) \in \mathbb{F}_q^v$ is chosen in the first layer. When the vector $s_v$ is plugged into $\mathcal{F}^{(i)}$ for i'=1, . . . , m, a linear system of o−1 equations with o variables ($x_v+1, \ldots, x_n$) and one quadratic equation with oil×oil quadratic terms of non-zero coefficients are obtained.

When Gaussian elimination is used in the linear system, each variable $x_i$ for i=v+1, . . . , n−1 can be expressed by an equation of a variable $x_n$.

$x_i$ for i=1, . . . , n−1 is plugged into a quadratic equation acquired from $\mathcal{F}^{(m)}$ and then the quadratic equation of $x_n$ is obtained.

After a solution $s_n$ of the quadratic equation of $x_n$ is obtained, $x_i=s_i$ for i=v+1, . . . , n−1 is calculated based on $x_n=s_n$.

Then, a vector $s=(s_1, \ldots, s_n)$ is the solution of $\mathcal{F}(x)=\xi$.

If the linear system of the first layer or the quadratic equation does not have a solution, a vector $s_v'=(s'_1, \ldots, s'_v)$ of new random vinegar values is newly chosen to perform the methods (or the processes) described above again.

When the number of layers is 2, three index sets V, $O_1$, and $O_2$ are required in the present inventive concepts to configure a new central map in accordance with the present inventive concepts having oil-oil quadratic terms of non-zero coefficients.

$$V=\{1, \ldots, v\}, O_1=\{v+1, \ldots, v+o_1\},$$
$$O_2=\{v+o_1+1, \ldots, v+o_1+o_2\}$$

Here, |V|=v, and $|O_i|=o_i$ for i=1 and 2. V is an index set for defining vinegar variables used in an Oil and Vinegar method, and $O_1$ and $O_2$ are index sets for defining oil variables used in the Oil and Vinegar method.

A central map $\mathcal{F}=(\mathcal{F}^{(1)}, \ldots, \mathcal{F}^{(m)})$, that is, a system of multivariate polynomials having $m=o_1+o_2$ equations and $n=v+m$ variables, is defined as shown in Equations 4 to 6.

$\mathcal{F}^{(k)}$ for $k=1, \ldots, o_1$ is defined as shown in Equation 4.

$$\mathcal{F}^{(k)}(x) = \sum_{i \in O_1, j \in V} \alpha_{ij}^{(k)} x_i x_j + \sum_{i,j \in V, i \leq j} \beta_{ij}^{(k)} x_i x_j + \sum_{i \in V \cup O_1} \gamma_i^{(k)} x_i + \eta^{(k)} \quad \text{[Equation 4]}$$

$\mathcal{F}^{(k)}$ for $k=o_1+1, \ldots, m-1$ is defined as shown in Equation 5.

$$\mathcal{F}^{(k)}(x) = \sum_{i \in O_2, j \in V \cup O_1} \alpha_{ij}^{(k)} x_i x_j + \sum_{i,j \in V \cup O_1, i \leq j} \beta_{ij}^{(k)} x_i x_j + \sum_{i \in V \cup O_1 \cup O_2} \gamma_i^{(k)} x_i + \eta^{(k)} \quad \text{[Equation 5]}$$

$\mathcal{F}^{(k)}$ for $k=m$ is defined as shown in Equation 6.

$$\mathcal{F}^{(k)}(x) = \sum_{i \in O_2, j \in V \cup O_1} \alpha_{ij}^{(k)} x_i x_j + \sum_{i,j \in V \cup O_1, i \leq j} \beta_{ij}^{(k)} x_i x_j + \sum_{i,j \in O_2, i \leq j} \delta_{i,j}^{(k)} x_i x_j + \sum_{i \in V \cup O_1 \cup O_2} \gamma_i^{(k)} x_i + \eta^{(m)} \quad \text{[Equation 6]}$$

Here, x is a vector $x=(x_1, \ldots, x_n)$, $\alpha_{ij}^{(k)}$, $\beta_{ij}^{(k)}$, $\delta_{ij}^{(k)}$, and $\gamma_i^{(k)}$ represent coefficients of corresponding terms, $\eta^{(k)}$ represents a constant, and each value is randomly chosen in the finite field $\mathbb{F}_q$ in which the number of elements is q.

$\mathcal{F}^{(i)}$ for $i=1, \ldots, o_1$ of is referred to as a secret polynomial in the first layer, and $\mathcal{F}^{(i)}$ for $i=o_1+1, \ldots, m$ is referred to as a secret polynomial in the second layer.

When the number of layers is two (2), the parameter set of the scheme according to the present inventive concepts is $\mathbb{F}_q$, v, $o_1$, $o_2$.

How to Invert a New Central Map

When $\xi=(\xi_1, \ldots, \xi_m)$ is given, processes of finding $\mathcal{F}^{-1}(\xi)=s$, that is, solutions s of $\mathcal{F}(x)=\xi$, are as follows.

In the first layer, a random vector of vinegar values, $s_v=(s_1, \ldots, s_v) \in \mathbb{F}_q^v$, is chosen. When the vector $s_v$ is plugged into the first layer $\mathcal{F}^{(i)}$ for $i=1, \ldots, o_1$, a linear system of $o_1$ equations with $o_1$ variables is obtained. A solution $(s_{v+1}, \ldots, s_{v+o_1})$ of the first linear system is obtained using Gaussian elimination.

In the second layer, values $(s_1, \ldots, s_{v+o_1})$ of the vector $s_v$ of vinegar values and the solution $(s_{v+1}, \ldots, s_{v+o_1})$ of the linear system are plugged into $F^{(j)}$ for $j=o_1+1, \ldots, m$. A linear system of $o_2-1$ equations with $o_2$ variables $x_{v+o_1+1}, \ldots x_n$ and one quadratic equation with oil×oil quadratic terms of non-zero coefficients are obtained.

Each variable $x_i$ for $i=v+o_1+1, \ldots, n-1$ can be expressed by an equation of variables $x_n$ using Gaussian elimination in the linear system.

$x_i$ for $i=v+o_1+1, \ldots, n-1$ is plugged into the quadratic equation acquired from $\mathcal{F}^{(m)}$ and then the quadratic equation of $x_n$ is obtained.

After the solution $s_n$ of the quadratic equation of $x_n$ is obtained, $x_i=s_i$ for $i=v+1, \ldots, n-1$ is calculated based on $x_n=s_n$.

Then, the vector $s=(s_1, \ldots, s_n)$ is the solution of $\mathcal{F}(x)=\xi$.

If the linear system of the first layer or the quadratic equation does not have solutions, a vector $s_v'=(s'_1, \ldots, s'_v)$ of new random vinegar values is newly chosen to perform the methods (or the processes) described above again.

Key Generation or Key Generation Step

With respect to security parameters, a pair of a public key and a secret key ($<PK.SK>=<\mathcal{P}.(\tilde{S}.\mathcal{F}.\tilde{T})>$) is generated as follows. A security parameter $\lambda$ may represent a security level.

1. Two affine maps ($\tilde{S}$ and $\tilde{T}$) are randomly selected. If $\tilde{S}$ and $\tilde{T}$ are not invertible, two (new) affine maps $\tilde{S}$ and $\tilde{T}$ are randomly selected again. Here, $\tilde{S}=S^{-1}$ and $\tilde{T}=T^{-1}$.

2. The central map $\mathcal{F}=\mathcal{F}^{(1)}, \ldots, \mathcal{F}^{(m)}$) described above is randomly selected.

3. The public key $\mathcal{P}=S \circ \mathcal{F} \circ T$ is calculated.

Signature Generation or Signature Generation Step

A hash message H(M) for a message M is calculated.
Here, H: $\{0, 1\}^* \to \mathbb{F}_q^m$ is a collision resistant hash function.

1. $\tilde{S}(H(M))=\xi$ is calculated.
2. $\mathcal{F}^{-1}(\xi)=s$, that is, a vector s for $\mathcal{F}(s)=\xi$, is obtained.
As described in the method of inverting a new central map,
(1) a random vector of vinegar values $s_v=(s_1, \ldots, s_v) \in \mathbb{F}_q^v$ is chosen,
(2) the vector $s_v$ is plugged into the first layer $F^{(i)}$ for $i=1, \ldots, o_1$,
(3) a linear system of $o_1$ equations with $o_1$ variables is obtained, and
(4) a solution $(s_{v+1}, \ldots, s_{v+o_1})$ of the linear system is obtained using Gaussian elimination.

Values $(s_1, \ldots, s_{v+o_1})$ of the vector $s_v$ and the solutions $(s_1, \ldots, s_{v+o_1})$ of the linear system are plugged into $F^{(i)}$ for $i=o_1+1, \ldots, m$, and a linear system of $o_2-1$ equations with $o_2$ variables and one quadratic equation with variables $(x_{v+o_1+1}, \ldots, x_n)$ are obtained.

In the linear system, $x_i(i=v+o_1+1, \ldots, n-1)$ expressed by an equation with variables $x_n$ is obtained.

$x_i$ for $i=v+o_1+1, \ldots, n-1$ is plugged into a quadratic equation acquired from $\mathcal{F}^{(m)}$ as the quadratic equation of $x_n$ is obtained.

After the solution $s_n$ of the quadratic equation of $x_n$ is obtained, $x_i=s_i$ for $i=v+o_1+1, \ldots, n-1$ is calculated based on $x_n=s_n$.

Then, $s=(s_1, \ldots, s_n)$ is the solution of $\mathcal{F}(x)=\xi$.

When one of the linear system of the first layer and the quadratic equation of the second layer does not have a solution, another vector $s_v'=(s'_1, \ldots, s'_v)$ of vinegar values will be chosen, and the processes described above will be performed again.

3. $\tilde{T}(s)=\sigma$ is calculated. $\sigma$ refers to an electronic signature of the message M.

Verification or Verification Step

When the electronic signature $\sigma$ for the message M and the public key $\mathcal{P}$ are given, it is checked whether $\mathcal{P}(\sigma)=H$ (M). When $\mathcal{P}(\sigma)$=H(M), the electronic signature σ is accepted, and otherwise, the electronic signature σ is rejected.

Figure 1:
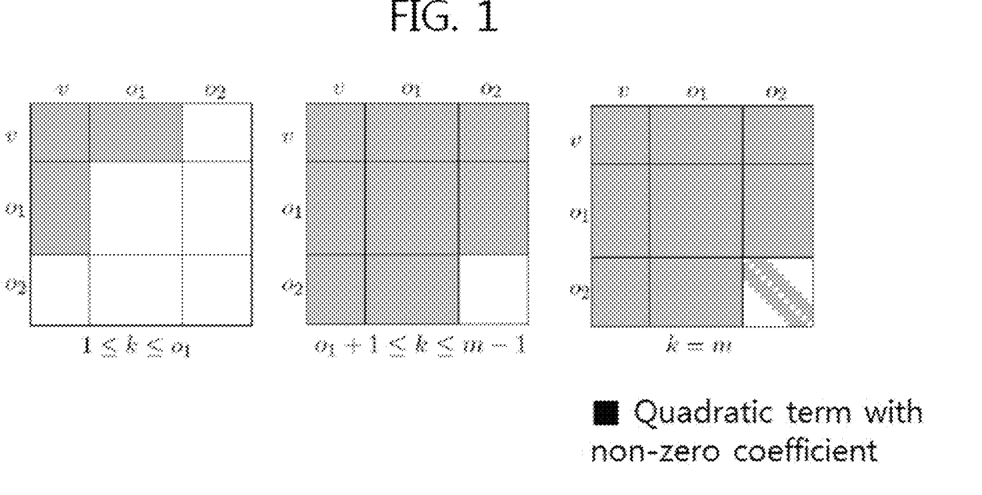
FIG. 1 is an exemplary embodiment of symmetric matrices related to quadratic parts of a central map with two layers according to the present inventive concepts.

FIG. 1 is an exemplary embodiment of symmetric matrices related to quadratic parts of a central map with two layers according to the present inventive concepts. Referring to FIG. 1, $F^{(k)}$ (1≤k≤m) is symmetric matrices corresponding to a homogeneous quadratic part of a $k^{th}$ polynomial of a central map $\mathcal{F}$ according to an exemplary embodiment of the present inventive concepts.

Referring to the symmetric matrices $F^{(i)}$ shown in FIG. 1, white parts represent elements of zero, and gray parts or quadrangles represent non-zero elements. $P^{(k)}$ (1≤k≤m) is symmetric matrices correspondnig to a quadratic part of a $k^{th}$ polynomial of the public key $\mathcal{P}$. Referring to FIG. 1, when k=m, non-zero elements are present in $o_2 \times o_2$ terms (or oil-oil quadratic terms). When 1≤k≤m, $\mathcal{F}^{(k)}$ having oil-oil quadratic terms can be presented regardless of a value of k.

For example, when the number of layers is two, $\mathcal{F}^{(k)}$ for k=1, . . . , $o_1$ in the first layer is defined as shown in Equation 7.

$$\mathcal{F}^{(k)}(x) = \sum_{i \in O_1, j \in V} \alpha_{ij}^{(k)} x_i x_j + \sum_{i,j \in V, i \leq j} \beta_{ij}^{(k)} x_i x_j + \sum_{i \in V \cup O_1} \gamma_i^{(k)} x_i + \eta^{(k)} \quad \text{[Equation 7]}$$

$\mathcal{F}^{(k)}$ for k=$o_1$+1, . . . , m−1 in a second layer is defined as shown in Equation 8.

$$\mathcal{F}^{(k)}(x) = \sum_{i \in O_2, j \in V \cup O_1} \alpha_{ij}^{(k)} x_i x_j + \sum_{i,j \in V \cup O_1, i \leq j} \beta_{ij}^{(k)} x_i x_j + \sum_{i \in V \cup O_1 \cup O_2} \gamma_i^{(k)} x_i + \eta^{(k)} \quad \text{[Equation 8]}$$

$\mathcal{F}^{(k)}$ for k=m in the second layer is defined as shown in Equation 9.

$$\mathcal{F}^{(k)}(x) = \sum_{i \in O_2, j \in V \cup O_1} \alpha_{ij}^{(k)} x_i x_j + \sum_{i,j \in V \cup O_1, i \leq j} \beta_{ij}^{(k)} x_i x_j + \sum_{i,j \in O_2, i \leq j} \delta_{i,j}^{(k)} x_i x_j + \sum_{i \in V \cup O_1 \cup O_2} \gamma_i^{(k)} x_i + \eta^{(m)} \quad \text{[Equation 9]}$$

A general case can be described as follows.

When u≥1, $v_1$, . . . , $v_{u+1}$ are integers, and 0<$v_1$<$v_2$< . . . <$v_u$<$v_{u+1}$=n. Here, u represents the number of layers.

Sets of integers $V_i$={1, . . . , $v_i$} for i=1, . . . , u, and when i=1, . . . , u, a set $o_i$=$v_{i+1}$−$v_i$ and a set $O_i$={$v_i$30 1, . . . , $v_{i+1}$} are defined. Then, |$V_i$|=$v_i$, |$O_i$|=$o_i$, m=$o_1$+ . . . +$o_u$, n=$v_1$+m, and $v_1$=v.

Polynomials $F^{(k)}$ having n variables $x_1$, . . . , $x_n$ k=1, . . . , m−1 are defined as shown in Equation 10.

$$\mathcal{F}^{(k)}(x) = \sum_{i \in O_l, j \in V_l} \alpha_{ij}^{(k)} x_i x_j + \sum_{i,j \in V_l, i \leq j} \beta_{ij}^{(k)} x_i x_j + \sum_{i \in V_l \cup O_l} \gamma_i^{(k)} x_i + \eta^{(k)} \quad \text{[Equation 10]}$$

Here, l is the only integer satisfying k∈$O_l$, and x=($x_1$, . . . , $x_n$).

When k=m, the polynomials $F^{(k)}$ are defined by Equation 11.

$$\mathcal{F}^{(k)}(x) = \sum_{i \in O_u, j \in V_u} \alpha_{ij}^{(k)} x_i x_j + \sum_{i,j \in V_u, i \leq j} \beta_{ij}^{(k)} x_i x_j + \sum_{i,j \in O_u, i \leq j} \delta_{i,j}^{(k)} x_i x_j + \sum_{i \in V_u \cup O_u} \gamma_i^{(k)} x_i + \eta^{(k)} \quad \text{[Equation 11]}$$

Figure 2:
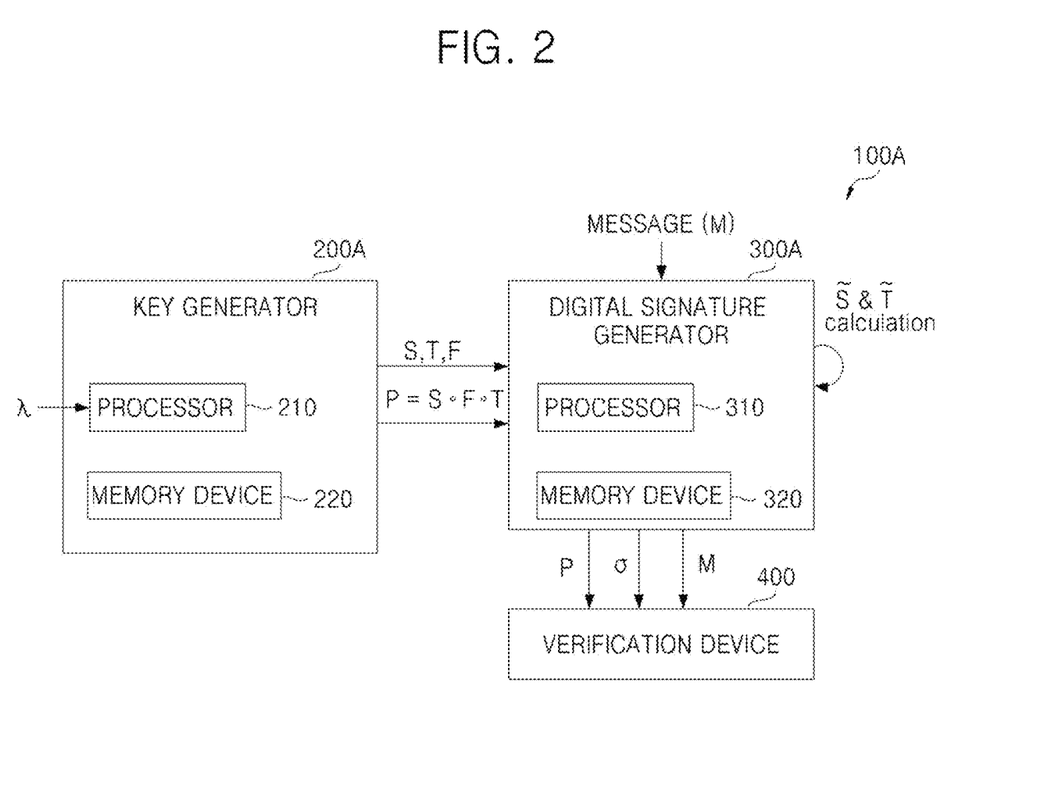
FIG. 2 is a block diagram of an electronic device according to exemplary embodiments of the present inventive concepts.

FIG. 2 is a block diagram of an electronic device according to exemplary embodiments of the present inventive concepts. Referring to FIG. 2, an electronic device 100A may include a key generator 200A, a digital signature generator 300A, and a verification device 400. The electronic device 100A, 100B, or 100C, collectively 100 to be described in the present specification may refer to an electronic system (or a quantum computer) which generates and verifies an electronic signature σ according to a multivariate quadratic electronic signature scheme based on the central map $\mathcal{F}$=($\mathcal{F}^{(1)}$, . . . , $\mathcal{F}^{(m)}$) having oil-oil (or oil×oil) quadratic terms of non-zero coefficients.

Figure 3:
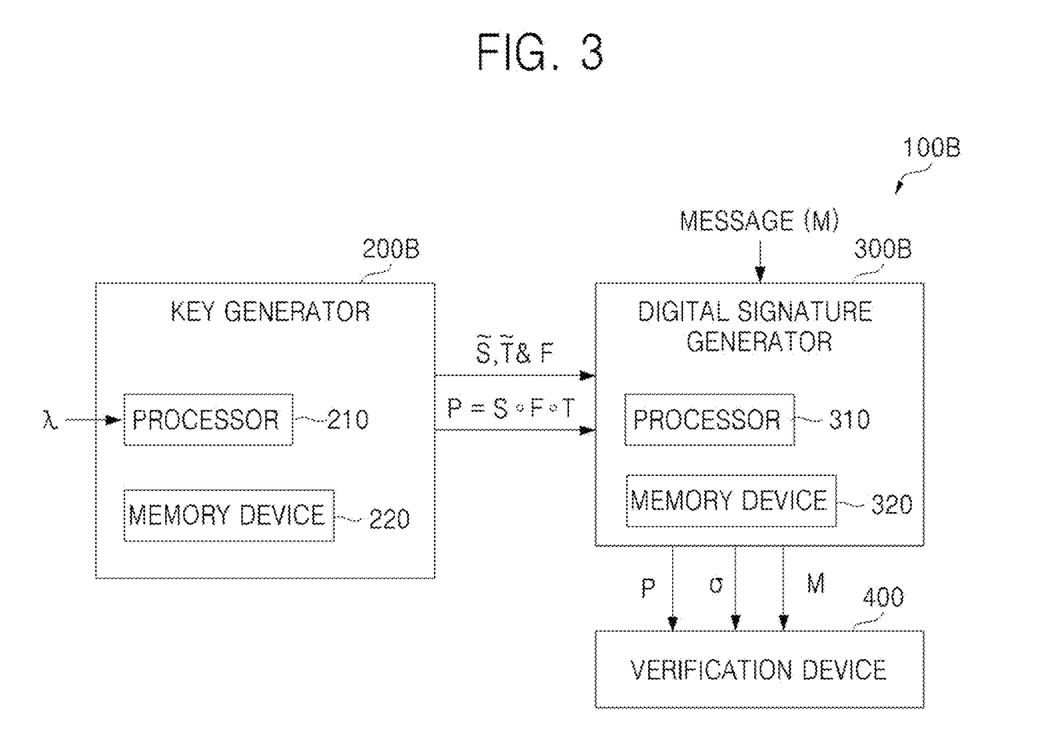
FIG. 3 is a block diagram of an electronic device according to exemplary embodiments of the present inventive concepts.
Figure 4:
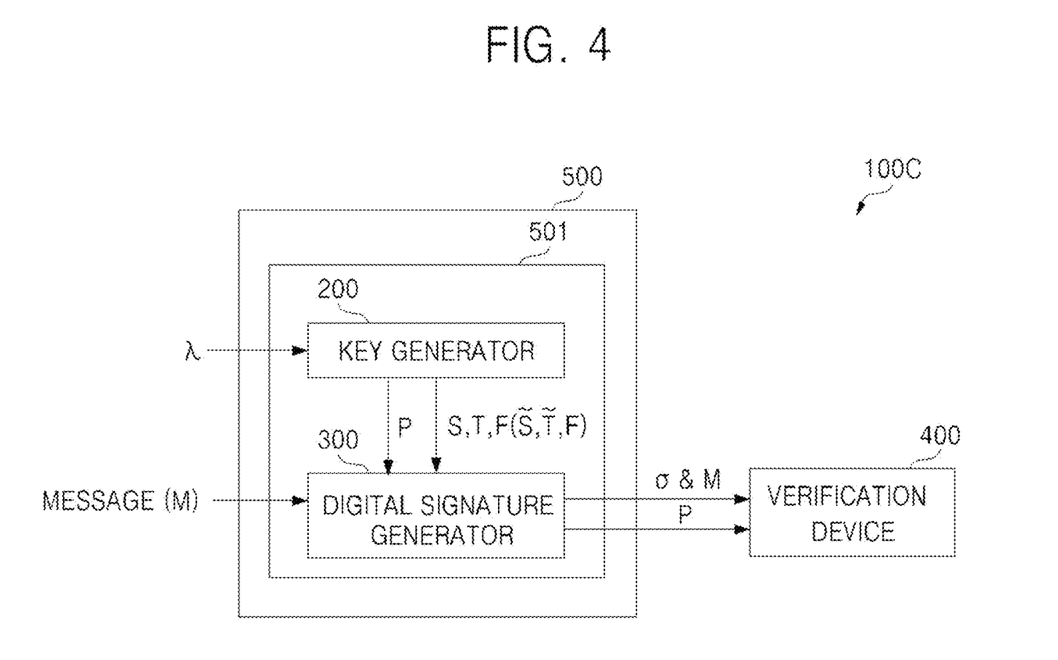
FIG. 4 is a block diagram of an electronic device according to exemplary embodiments of the present inventive concepts.

Although it is shown in FIGS. 2 to 4 that the key generator, the digital signature (or electronic signature) generator, and verification device are implemented as separate pieces of hardware, all of constituents corresponding to the key generator, the digital signature generator, and the verification device can be created by a computer program (or a computer program code).

The key generator 200A may perform the key generation (or key generation step) described above. For example, the key generator 200A may generate a public key $\mathcal{P}$=($\mathcal{P}^{(1)}$, . . . , $\mathcal{P}^{(m)}$)=S∘$\mathcal{F}$∘T using a first affine map S, a second affine map T, and a third map (for example, the central map $\mathcal{F}$).

The key generator 200A may include a processor 210 and a memory device 220. The memory device 220 may be implemented as a non-volatile memory device which stores maps including the first affine map S, the second affine map T, and the third map (for example, the central map $\mathcal{F}$).

The processor 210 may generate the public key $\mathcal{P}$=($\mathcal{P}^{(1)}$, . . . , $\mathcal{P}^{(m)}$)=S∘$\mathcal{F}$∘T using the maps S, T, and $\mathcal{F}$ stored in the memory device 220, and the security parameter λ may be input from the outside of the key generator 200A.

The key generator 200A may transmit the maps S, T, and $\mathcal{F}$ and the public key $\mathcal{P}$=($\mathcal{P}^{(1)}$, . . . , $\mathcal{P}^{(m)}$)=S∘$\mathcal{F}$∘T to the digital signature generator 300A through a first communication network.

According to exemplary embodiments, when the key generator 200A transmits the public key $\mathcal{P}$ to an authentication generator (or an authentication institute), the authentication generator may generate an authentication (or a certificate) for the public key $\mathcal{P}$, and transmit a generated authentication to the key generator 200A. As a result, the key generator 200A may transmit the public key $\mathcal{P}$ and/or the authentication to the digital signature generator 300A. The public key $\mathcal{P}$ in the present specification and claims may be understood as a generic reference to the public key $\mathcal{P}$ and the authentication for the public key $\mathcal{P}$.

The digital signature generator 300A may perform the signature generation (or the signature generation step) described above. For example, a processor 310 of the digital signature generator 300A may receive the maps S, T, and $\mathcal{F}$ transmitted from the key generator 200A, calculate inversions $\tilde{S}$=$S^{-1}$ and $\tilde{T}$=$T^{-1}$ of the maps S and T, store calculated inversions $\tilde{S}=S^{-1}$ and $\tilde{T}=T^{-1}$ in the memory device 320, and perform the signature generation (or the signature generation step) using the maps $\tilde{S}=S^{-1}$, $\mathcal{F}$, and $\tilde{T}=T^{-1}$ stored in the memory device 320.

The processor 310 may generate a hash message H(M) by applying a hash function to a given message M, generate an electronic signature σ for the hash message H(M) on the basis of contents described in the signature generation (or the signature generation step), and transmit one of the public key $\mathcal{P}$ and the authentication including the public key $\mathcal{P}$, the message M, and the electronic signature σ to the verification device 400 through a third communication network.

The first communication network, the second communication network, and the third communication network may be the same communication network or different communication networks, but the present exemplary embodiment is not limited thereto. For example, the message M may be input from the outside of the digital signature generator 300A.

The verification device 400 may perform the verification (or the verification step) described above. For example, the verification device 400 may check whether P(σ)=H(M) using one of the public key $\mathcal{P}$ and the authentication including the public key $\mathcal{P}$ transmitted from the digital signature device 300A, the message M, and the electronic signature σ, and determine whether to accept or to reject the electronic signature σ in accordance with a result of the check. For example, the verification device 400 can perform the verification step by extracting the public key $\mathcal{P}$ from the authentication even though the authentication for the public key $\mathcal{P}$ is received instead of the public key $\mathcal{P}$.

FIG. 3 is a block diagram of an electronic device according to exemplary embodiments of the present inventive concepts. Referring to FIG. 3, an electronic device 100B may include a key generator 200B, a digital signature generator 300B, and the verification device 400.

The key generator 200B may perform the key generation (or the key generation step) described above. The memory device 220 of the key generator 200B stores maps including the first affine map S, the second affine map T, and the third map (for example, the central map $\mathcal{F}$), and a computer program for performing a function of calculating each of the inversions $\tilde{S}=S^{-1}$ and $\tilde{T}=T^{-1}$ of respective maps S and T, and a function of generating the public key $\mathcal{P}=(\mathcal{P}^{(1)}, \ldots, \mathcal{P}^{(m)})=S \circ \mathcal{F} \circ T$ using the maps S, T, and $\mathcal{F}$.

The processor 210 may generate the public key $\mathcal{P}=(\mathcal{P}^{(1)}, \ldots, \mathcal{P}^{(m)})=S \circ \mathcal{F} \circ T$ by executing the computer program. For example, the security parameter λ may be input from the outside of the key generator 200B.

The key generator 200B calculates inversions $\tilde{S}$ and $\tilde{T}$, and safely transmits the inversions $\tilde{S}$ and $\tilde{T}$, the third map $\mathcal{F}$, and the public key $\mathcal{P}$ to the digital signature generator 300B.

According to exemplary embodiments, when the key generator 200B transmits the public key $\mathcal{P}$ to an authentication generator (or an authentication institute), the authentication generator may generate an authentication for the public key $\mathcal{P}$, and transmit a generated authentication to the key generator 200B. As a result, the key generator 200B may safely transmit the inversions $\tilde{S}$ and $\tilde{T}$, the third map $\mathcal{F}$, and the authentication to the digital signature generator 300B.

The digital signature generator 300B may perform the signature generation (or the signature generation step) described above. For example, the processor 310 of the digital signature generator 300B may receive the maps $\tilde{S}$, $\tilde{T}$, and $\mathcal{F}$ transmitted from the key generator 200B, store them in the memory device 320, and perform the signature generation (or the signature generation step) using the maps $\tilde{S}=S^{-1}$, $\mathcal{F}$, and $\tilde{T}=T^{-1}$ stored in the memory device 320. According to exemplary embodiments, when the key generator 200B transmits an authentication for the public key $\mathcal{P}$, the authentication may be stored in the memory device 320 under control of the processor 310.

The processor 310 of the digital signature generator 300B may generate a hash message H(M) by applying a hash function to a given message M, generate an electronic signature σ for the hash message H(M) on the basis of contents described in the signature generation (or the signature generation step), and transmit one of the public key $\mathcal{P}$ and the authentication including the public key $\mathcal{P}$, the message M, and the electronic signature σ to the verification device 400 at the same time through the third communication network.

The verification device 400 may perform the verification (or the verification step) described above. For example, the verification device 400 may check whether P(σ)=H(M) using one of the public key $\mathcal{P}$ and the authentication including the public key $\mathcal{P}$ transmitted from the digital signature device 300B, the message M, and the electronic signature σ, and determine whether to accept or to reject the electronic signature σ in accordance with a result of the check.

FIG. 4 is a block diagram of an electronic device according to exemplary embodiments of the present inventive concepts. Referring to FIGS. 2 and 3, the key generator 200A or 200B may be implemented as devices that do not share one system board or one silicon substrate. However, the key generator 200 and the digital signature generator 300 in an electronic device 100C of FIG. 4 may share one system board or one silicon substrate 501 in one electronic device 500. The system board 501 may refer to a main circuit board, a main printed circuit board (PCB), or a system board in an electronic device or a computer.

The key generator 200 that performs a key generation transmits the information S, T, $\mathcal{F}$, and $\mathcal{P}$, or $\tilde{S}$, $\tilde{T}$, $\mathcal{F}$, and $\mathcal{P}$ to the digital signature generator 300. As described above, the key generator 200 transmits an authentication including the information S, T, and $\mathcal{F}$ or $\tilde{S}$, $\tilde{T}$, and $\mathcal{F}$ and the public key $\mathcal{P}$ to the digital signature generator 300.

The digital signature generator 300 that performs a signature generation may generate an electronic signature σ using the information S, T, $\mathcal{F}$, and $\mathcal{P}$, or $\tilde{S}$, $\tilde{T}$, $\mathcal{F}$, and $\mathcal{P}$, and transmit one of the public key $\mathcal{P}$ and the authentication including the public key $\mathcal{P}$, the message M, and the electronic signature σ to the verification device 400 at the same time through the third communication network. The verification device 400 may perform verification.

Figure 5:
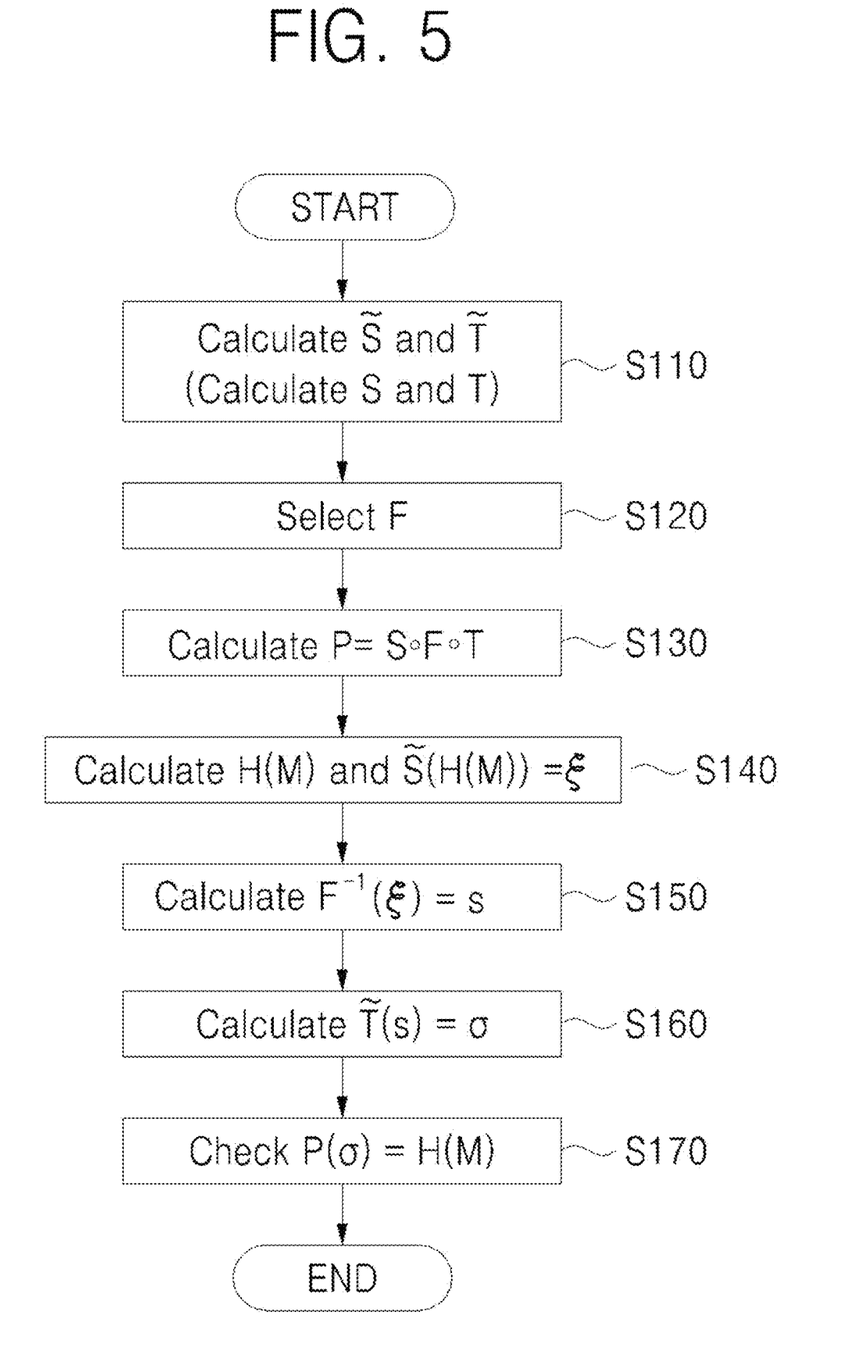
FIG. 5 is a flowchart which describes the operation of the electronic device shown in FIG. 2, 3, or 4.

FIG. 5 is a flowchart which describes the operation of the electronic device shown in FIG. 2, 3, or 4. Referring to FIGS. 2 to 5, the maps S and T or $\tilde{S}$ and $\tilde{T}$ are calculated (S110). The inversions $\tilde{S}$ and $\tilde{T}$ may be calculated by the digital signature generator 300A of FIG. 2, may be calculated by the key generator 200B of FIG. 3, or may be generated or calculated by the key generator 200 of FIG. 4.

The operation of each device 100 can be briefly described with reference to FIGS. 2 to 5 as follows.

The key generator 200A, 200B, or 200 (collectively, referred to as 200) randomly selects the third map $\mathcal{F}$ (S120).

The key generator 200 calculates a public key $\mathcal{P}=S \circ \mathcal{F} \circ T$ (S130).

When a message M is given, the digital signature generator 300A, 300B, or 300 (collectively, referred to as 300) calculates H(M) and $\tilde{S}$ (H(M))=ξ(S140).

The digital signature generator 300 calculates $\mathcal{F}^{-1}(\xi)=s$ (S150).

The digital signature generator 300 calculates T̃(s)=σ (S160).

The verification device 400 checks whether P(σ)=H(M) using one of the public key $\mathcal{P}=S\circ\mathcal{F}\circ T$ and an authentication including the public key $\mathcal{P}=S\circ\mathcal{F}\circ T$, the message M, and the electronic signature σ (S170).

The key generation, the signature generation, and the verification described in the present specification can be performed by a computer program (or program codes) executed in each device 100A, 100B, or 100C. The computer program (or the program codes) which is installed in a computer (for example, each device 100A, 100B, or 100C) and can be read by the computer may be stored in a recording medium. The storage medium (for example, 210 or 220) denotes a non-transitory storage medium.

The multivariate quadratic electronic signature scheme according to the exemplary embodiments of the present inventive concepts can safely generate an electronic signature of a message by inverting the central map despite of the existence of oil-oil quadratic terms of non-zero coefficients on the basis of a central map having oil-oil quadratic terms of non-zero coefficients.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic device for generating and verifying an electronic signature, the electronic device including:
   a key generator including a first memory configured to store a first affine map $S:F_q^m \rightarrow F_q^m$ and a second affine map $S:F_q^n \rightarrow F_q^n$, and a first processor connected to the memory,
   wherein the processor of the key generator is configured to:
   acquire the first affine map S and the second affine map T from the memory,
   randomly generate a third map $F:F_q^n \rightarrow F_q^n = (F^{(1)}, \ldots, F^{(m)})$, and
   generate a public key P using the first affine map, the second affine map, and the third map by composition,
   wherein the third map F is a system of multivariate quadratic polynomials $F^{(1)}, \ldots, F^{(m)}$ having n variables and m equations,
   wherein at least one of the multivariate quadratic polynomials has oil times oil quadratic terms with non-zero coefficients, and
   wherein the third map F includes at least one first index set for defining vinegar variables used in an Oil and Vinegar method and at least one second index set for defining oil variables used in the Oil and Vinegar method, and $F_2$ is a finite field in which the number of elements is q;
   a digital signature generator connected to the key generator via a first communication network and configured to receive the public key P via the first communication network and a message M, and generate an electronic signature σ for the message M,
   wherein the digital signature generator calculates a hash function H(M) for the message M, calculates s̃(H(M))=ξ when ξ=(ξ$_1$, ..., ξ$_m$) is given, calculates a vector s satisfying $F^{-1}(\xi)=s$, and calculates T̃(s)=σ to generate the signature σ; and
   a verification device connected to the digital signature generator via a second communication network and configured to:
   receive the public key P, the message M, and the electronic signature a;
   verify whether P(α) is equal to H(M); and
   and accept or reject the electronic signature a based on the verification.

2. The electronic device of claim 1,
   wherein, when u representing the number of layers is 1 or more, $v_1, \ldots, v_{u+1}$ are integers, $0<v_1<v_2< \ldots <v_u<v_{u+1}=n$,
   the at least one first index set is sets of integers $v_i=\{1, \ldots, v_i\}$, the at least one second index set is sets of integers $O_i=\{v_i+1, \ldots, v_{i+1}\}$, $o_i=v_{i+1}-v_i$, $|V|=v$, $|O_i|=o_i$, $i=1, \ldots, u$, $m=o_1+ \ldots +o_u$, and $n=v_1+m$.

3. The electronic device of claim 1,
   wherein the at least one first index set is $V=\{1, \ldots, v\}$, the at least one second index set is $O_1=\{v+1, \ldots, v+o_1\} O_2=\{v+o_1+1, \ldots, v+o_1+o_2\}$,
   $|V|=v$, $|O_i|=o_i$, $i=1$ and 2,
   a last polynomial $F^{(m)}$ of the multivariate quadratic polynomials $F^{(1)}, \ldots, F^{(m)}$ has the oil times oil quadratic terms with non-zero coefficients, the $m=o_1+o_2$, and the $n=v+m$.

4. The electronic device of claim 1,
   wherein, when a layer of $F^{(k)}$ includes a first layer and a second layer,
   $F^{(k)}$ for $k=1, \ldots, o_1$ in the first layer is defined as follows $$\mathcal{F}^{(k)}(x) = \sum_{i\in O_1, j\in V} \alpha_{ij}^{(k)} x_i x_j + \sum_{i,j\in V, i\leq j} \beta_{ij}^{(k)} x_i x_j + \sum_{i\in V\cup O_1} \gamma_i^{(k)} x_i + \eta^{(k)},$$

$F^{(k)}$ for $k=o_1+1, \ldots, m-1$ in the second layer is defined as follows $$\mathcal{F}^{(k)}(x) = \sum_{i\in O_2, j\in V\cup O_1} \alpha_{ij}^{(k)} x_i x_j + \sum_{i,j\in V\cup O_i, i\leq j} \beta_{ij}^{(k)} x_i x_j + \sum_{i\in V\cup O_1\cup O_2} \gamma_i^{(k)} x_i + \eta^{(k)},$$

$F^{(k)}$ for $k=m$ in the second layer is defined as follows $$\mathcal{F}^{(k)}(x) = \sum_{i\in O_2, j\in V\cup O_1} \alpha_{ij}^{(k)} x_i x_j + \sum_{i,j\in V\cup O_1, i\leq j} \beta_{ij}^{(k)} x_i x_j + \sum_{i,j\in O_2, i\leq j} \delta_{ij}^{(k)} x_i x_j + \sum_{i\in V\cup O_1\cup O_2} \gamma_i^{(k)} x_i + \eta^{(m)},$$

and
a vector herein $x=(x_1, \ldots, x_n)$.

5. The electronic device of claim 1,
   wherein the at least one first index set is $v=\{1, \ldots, v\}$, the at least one second index set is $O=\{v+1, \ldots, v+o\}$, $|V|=v$, $|O|=o$, $F^{(k)}$ for $k=1, \ldots, m-1$ is defined as follows $$\mathcal{F}^{(k)}(x) = \sum_{i\in O, j\in V} \alpha_{ij}^{(k)} x_i x_j + \sum_{i,j\in V, i\leq j} \beta_{ij}^{(k)} x_i x_j + \sum_{i\in V\cup O} \gamma_i^{(k)} x_i + \eta^{(k)}$$

$F^{(k)}$ for k=m is defined as follows $$\mathcal{F}^{(k)}(x) = \sum_{i \in O, j \in V} \alpha_{ij}^{(k)} x_i x_j + \sum_{i,j \in V, i \leq j} \beta_{ij}^{(k)} x_i x_j + \sum_{i,j \in O, i \leq j} \delta_{ij}^{(k)} x_i x_j + \sum_{i \in V \cup O} \gamma_i^{(k)} x_i + \eta^{(k)},$$

and
a vector herein $x=(x_1, \ldots, x_n)$.

6. An electronic signature method using an electronic device comprising:
   acquiring a first affine map $S: F_q^m \to F_q^m$, a second affine map $T: F_q^n \to F_q^n$, and a third map $F: F_q^n \to F_q^m = (F^{(1)}, \ldots, F^{(m)})$;
   generating a public key $P = S \cdot F \cdot T$ using the first affine map, the second affine map, and the third map,
   wherein the third map F is a system of multivariate quadratic polynomials $F^{(1)}, \ldots, F^{(m)}$ having n variables and m equations,
   at least one of the multivariate quadratic polynomials has oil times oil quadratic terms with non-zero coefficients,
   the third map F includes at least one first index set for defining vinegar variables used in an Oil and Vinegar method and at least one second index set for defining oil variables used in the Oil and Vinegar method, $F_q$ and is a finite field in which the number of elements is q;
   receiving a message M via a first communication network;
   calculating a first inversion $\tilde{S}$ of the first affine map S and a second inversion $\tilde{T}$ of the second affine map T;
   generating a signature σ of the message M using the first inversion $\tilde{S}$, the second inversion $\tilde{T}$, and the third map F; and
   calculating a hash function H(M) for the message M, calculates (H(M))=ξ when is given, calculates a vector satisfying, and calculates to generate the signature σ;
   verifying whether P(σ) is equal to H(M); and
   accepting or rejecting the electronic signature σ based on the verification.

7. The electronic signature method using an electronic device of claim 6,
   wherein, when u representing the number of layers is 1 or more, $v_1, \ldots, v_{u+1}$ are integers, $0 < v_1 < v_2 < \ldots < v_u < v_{u+1} = n$,
   the at least one first index set is sets of integers $V_i = \{1, \ldots, v_i\}$,
   the at least one second index set is sets of integers $O_i = \{v_i+1, \ldots, v_{i+1}\}$,
   $o_i = v_{i+1} - v_i$,
   $|V_i|=v_i$, $|O_i|=o_i$, $i=1, \ldots, u$, $m=o_1+\ldots+o_u$, and $n=v_i+m$.

8. The electronic signature method using an electronic device of claim 7,
   wherein the multivariate quadratic polynomials having n variables $x_1, \ldots, x_n$ for $k=1, \ldots, m-1$ are defined as follows $$\mathcal{F}^{(k)}(x) = \sum_{i \in O_l, j \in V_l} \alpha_{ij}^{(k)} x_i x_j + \sum_{i,j \in V_l, i \leq j} \beta_{ij}^{(k)} x_i x_j + \sum_{i \in V_l \cup O_l} \gamma_i^{(k)} x_i + \eta^{(k)},$$

l is the only integer satisfying, $k \in O_l$, and $x=(x_1, \ldots, x_n)$, and
when k=m, the multivariate quadratic polynomials are defined as follows $$\mathcal{F}^{(k)}(x) = \sum_{i \in O_u, j \in V_u} \alpha_{ij}^{(k)} x_i x_j + \sum_{i,j \in V_u, i \leq j} \beta_{ij}^{(k)} x_i x_j + \sum_{i,j \in O_u, i \leq j} \delta_{ij}^{(k)} x_i x_j + \sum_{i \in V_u \cup O_u} \gamma_i^{(k)} x_i + \eta^{(k)},$$

and
$1 \leq k \leq m$.

9. The electronic signature method using an electronic device of claim 6,
   wherein the at least one first index set is $V=\{1, \ldots, v\}$,
   the at least one second index set is $O_1=\{v+1, \ldots, v+o_1\}$ $O_2=\{v+o_1+1, \ldots, v+o_1+o_2\}$,
   $|V|=v$, $|O_i|=o_i$, $i=1$ and 2,
   a last polynomial $F^{(m)}$ of the multivariate quadratic polynomials $F^{(1)}, \ldots, F^{(m)}$ has the oil times oil quadratic terms with non-zero coefficients, the $m=o_1+o_2$, and the $n=v+m$.

10. The electronic signature method using an electronic device of claim 6,
    wherein the at least one first index set is $V=\{1, \ldots, v\}$,
    the at least one second index set is $O=\{v+1, \ldots, v+o\}$,
    $|V|=v$, $|O|=o$,
    $F^{(k)}$ for $k=1, \ldots, m-1$ is defined as follows $$\mathcal{F}^{(k)}(x) = \sum_{i \in O, j \in V} \alpha_{ij}^{(k)} x_i x_j + \sum_{i,j \in V, i \leq j} \beta_{ij}^{(k)} x_i x_j + \sum_{i \in V \cup O} \gamma_i^{(k)} x_i + \eta^{(k)},$$

$F^{(k)}$ for k=m is defined as follows $$\mathcal{F}^{(k)}(x) = \sum_{i \in O, j \in V} \alpha_{ij}^{(k)} x_i x_j + \sum_{i,j \in V, i \leq j} \beta_{ij}^{(k)} x_i x_j + \sum_{i,j \in O, i \leq j} \delta_{ij}^{(k)} x_i x_j + \sum_{i \in V \cup O} \gamma_i^{(k)} x_i + \eta^{(k)},$$

and
a vector herein $x=(x_1, \ldots, x_n)$.

11. An electronic signature method using an electronic device comprising:
    acquiring a first affine map $S: F_q^m \to F_q^m$ a second affine map $T: F_q^n \to F_q^n$, and a third map $F: F_q^n \to F_q^m = (F^{(1)}, \ldots, F^{(m)})$;
    generating a public key $P=S \cdot F \cdot T$ using the first affine map, the second affine map, and the third map;
    receiving an authentication for the public key P via a first communication network, after the public key P is transmitted to the outside of the electronic device,
    wherein the third map F is a system of multivariate quadratic polynomials $F^{(1)}, \ldots, F^{(m)}$ having n variables and m equations,
    at least one of the multivariate quadratic polynomials has oil times oil quadratic terms with non-zero coefficients,
    the third map F includes at least one first index set for defining vinegar variables used in an Oil and Vinegar method and at least one second index set for defining oil variables used in the Oil and Vinegar method, and $F_q$ is a finite field in which the number of elements is q;
    receiving a message M from the outside of the electronic device;
    calculating a first inversion $\tilde{S}$ of the first affine map S and a second inversion $\tilde{T}$ of the second affine map T;

generating a signature σ of the message M using the first inversion S̃, the second inversion T̂, and the third map F; and calculating a hash function H(M) for the message M, calculates (H(M))=ξ when is given, calculates a vector satisfying, and calculates to generate the signature σ;

verifying whether P(σ) is equal to H(M); and accepting or rejecting the electronic signature σ based on the verification.

12. The electronic signature method of claim 11, wherein, when u representing the number of layers is 1 or more $v_1, \ldots, v_{u+1}$ are integers, $0<v_1<v_2< \ldots <v_u<v_{u+1}=n$, the at least one first index set is sets of integers $V_i=\{1, \ldots, v_i\}$, the at least one second index set is sets of integers $O_i=\{v_i+1, \ldots, v_{i+1}\}$, $o_i=v_i+1-v_i$, $|V_i|=v_i$, $|O_i|=o_i$, $i=1, \ldots, u$, $m=o_1+ \ldots +o_u$, and $n=v_i+m$.

13. The electronic signature method of claim 11, wherein the at least one first index set is $V=\{1, \ldots, v\}$, the at least one second index set is $O_1=\{v+1, \ldots, v+o_1\} O_2=\{v+o_1+1, \ldots, v+o_1+o_2\}$, $|V|=v$, $|O_i|=o_i$, $i=1$ and $2$.

14. The electronic signature method of claim 11, wherein the at least one first index set is $V=\{1, \ldots, v\}$, the at least one second index set is $O=\{v+1, \ldots, v+o\}$, $|V|=v$, and $|O|=o$.

* * * * *